J. L. DU FRANE.
VEHICLE SIGNAL.
APPLICATION FILED SEPT. 18, 1919.
1,382,767.
Patented June 28, 1921.
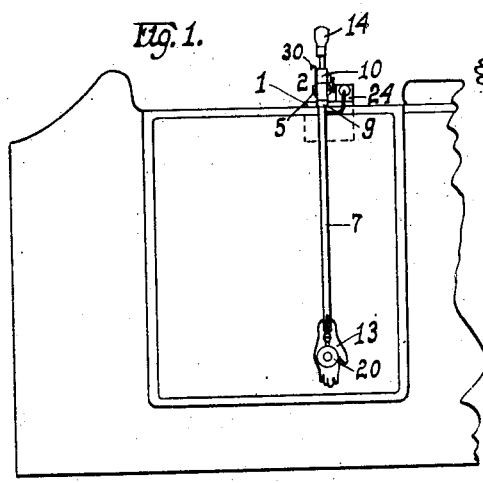
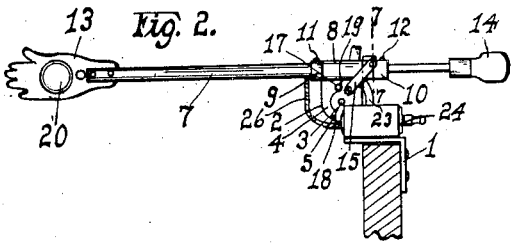
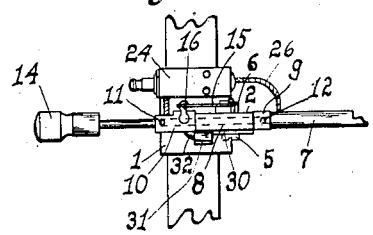
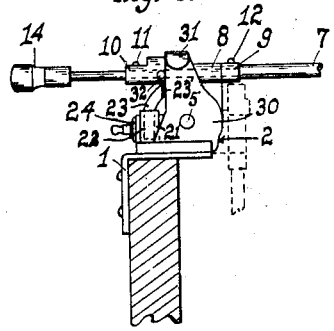
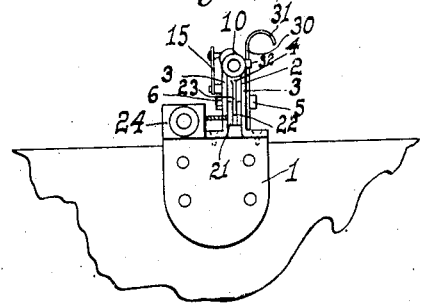
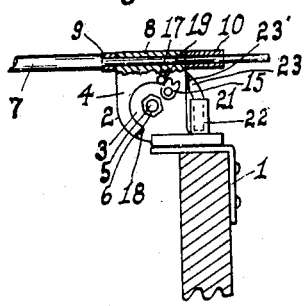
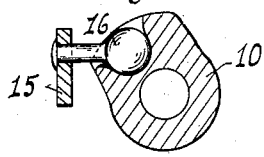
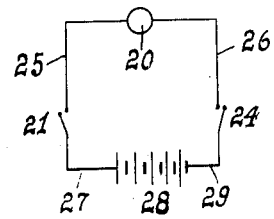
Inventor
John L. DuFrane.
By Harry C. Schroeder
Attorney

UNITED STATES PATENT OFFICE.

JOHN L. DU FRANE, OF OAKLAND, CALIFORNIA.

VEHICLE-SIGNAL.

1,382,767.   Specification of Letters Patent.   Patented June 28, 1921.

Application filed September 18, 1919. Serial No. 324,726.

*To all whom it may concern:*

Be it known that I, JOHN L. DU FRANE, a citizen of the United States, residing at Oakland, in the county of Alameda and State of California, have invented certain new and useful Improvements in Vehicle-Signals, of which the following is a specification.

My invention is an improved automobile signal.

Referring to the annexed drawing which forms a part of this specification:

Figure 1 is a side view of my signal applied to an automobile, the signal being shown in non-signaling position.

Fig. 2 is a rear view of my signal in signaling position.

Fig. 3 is a fragmentary front view of my signal.

Fig. 4 is a fragmentary plan of my signal.

Fig. 5 is a side view of my signal from the inside of the automobile.

Fig. 6 is a fragmentary rear view of my signal partly in section.

Fig. 7 is a sectional view on line 7—7 of Fig. 2.

Fig. 8 is a diagram of the signal circuit.

In the drawing 1 indicates an L-shaped base, one member of which rests upon the upper edge of the automobile side door and the other member is screwed to the inside of the door. On the upper member of base 1 is mounted a hinge 2 which comprises two L-shaped hinge members 3 resting upon and screwed to said base members, a hinge member 4 fitting between members 3, a bolt 5 extending through said members, and a nut 6 screwing on the end of the bolt. A signal arm 7 is journaled near its inner end in a bearing 8 on the upper edge of hinge member 4 and collars 9 and 10 are secured on the arm by set screws 11 and 12 at each end of said bearing to prevent longitudinal movement of the arm in said bearing. The arm 7 is hollow from its journal to its outer end, and in its outer end is secured an indicator 13 in the form of a hand. On the inner end of the arm 7 is secured a handle 14. A link 15 is pivoted at one end to one of the members 3 and is connected at its other end by a ball and socket joint 16 to collar 10. A pin 17 which projects from one side of hinge member 4 is adapted to engage notches 18 and 19 to limit the movement of the signal arm 7 respectively in vertical position outside the automobile door and in a horizontal or signaling position. In the indicator 13 is mounted an electric light 20. A switch 21 includes a pair of switch members 22 upstanding from base 1 and a blade 23 mounted on the hinge member 4, but insulated therefrom by insulation 23', adapted to extend between members 22 when the signal arm 7 is in horizontal position. A controlling switch 24 is mounted on base 1. Leads 25 and 26 lead respectively from one terminal of light 20 and connect to one terminal of switches 21 and 24. A lead 27 connects the other terminal of switch 21 and one terminal of a battery 28. A lead 29 connects the other terminal of switch 24 to the other terminal of battery 28. A flat vertical spring 30 is secured to the base 1 at one side of the hinge 2 and has a curved handle 31. A latch 32 which projects from the collar 10 engages the inner edge of spring 30 to hold the signal arm 7 and indicator 13 in horizontal or signaling position.

Normally the signal arm and indicator rest in a vertical position outside the door of the automobile with the indicator 13 facing the side of the automobile door, as shown in Fig. 1. The signal is swung into signaling position by the driver upon grasping handle 14 and swinging the arm 7 into horizontal position, during which operation the arm 7 is turned ninety degrees through the medium of link 15, joint 16 and collar 10, and the face of the indicator 13 and lamp 20 are turned rearwardly into signaling position; the blade 21 engages switch members 22 and closes switch 21 and the light circuit; the signal arm is arrested in signaling position by the engagement of pin 17 with notch 19; and the latch 32 snaps into engagement with the rear edge of spring 30 and holds the signal in signaling position.

Upon grasping handle 31 and pulling spring 30 outwardly out of engagement with latch 32 the arm 7 swings back into non-signaling position as shown in Fig. 1.

Having described my invention, I claim:

1. An automobile signal including a support, a hinge, one member of said hinge being fixed on said support, a rod journaled in the other member of said hinge, an indicator on said rod, and a link connected at one end to the fixed member of said hinge, a ball and socket connection connecting the other end of said link to said rod for turning the indicator into indicating position when the rod is swung into signaling position and for turning said indicator out of indicating position when the rod is swung into non-signaling position.

2. An automobile signal including a support, a hinge, one member of said hinge being fixed on said support, a rod journaled in the other member of said hinge, an indicator on said rod, said rod and indicator normally resting in a vertical position turned so that the indicator is out of its signaling plane, means for turning said indicator into signaling plane when the rod is swung into horizontal and signaling position, a flat spring secured to one side of the fixed hinge member, the upper end of said flat spring being curved outwardly, and a latch on said rod for engaging said curved part of said spring and passing the spring outwardly until the spring snaps in front of the latch and locks the rod and signal in signaling position.

3. An automobile signal including a support, a hinge, one member of said hinge being fixed on said support, a rod journaled in the other member of said hinge, an indicator on said rod, said rod and indicator normally resting in a vertical position turned so that the indicator is out of its signaling plane, means for turning said indicator into signaling plane, means for locking the rod and indicator in signaling position, the fixed hinge member having two notches, and a pin on the other hinge member for engaging said notches and respectively limiting the movement of the rod and indicator in signaling and non-signaling position.

In testimony whereof I affix my signature.

JOHN L. DU FRANE.